(12) United States Patent
Tsai et al.

(10) Patent No.: US 10,104,643 B2
(45) Date of Patent: Oct. 16, 2018

(54) METHOD AND APPARATUS FOR HETEROGENEOUS COMMUNICATION

(71) Applicant: MEDIATEK INC., Hsinchu (TW)

(72) Inventors: Chia-Hung Tsai, Santa Clara, CA (US); Chien-Chun Huang-Fu, Hsinchu (TW); Jun-Hua Chou, Taipai (TW); Yih-Shen Chen, Hsinchu County (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 14/931,961

(22) Filed: Nov. 4, 2015

(65) Prior Publication Data

US 2016/0135144 A1 May 12, 2016

Related U.S. Application Data

(60) Provisional application No. 62/076,128, filed on Nov. 6, 2014.

(51) Int. Cl.
*H04M 1/00* (2006.01)
*H04W 72/02* (2009.01)
(Continued)

(52) U.S. Cl.
CPC ....... *H04W 72/02* (2013.01); *H04W 52/0251* (2013.01); *H04W 52/0258* (2013.01);
(Continued)

(58) Field of Classification Search
None
See application file for complete search history.

(56) References Cited

U.S. PATENT DOCUMENTS 7,469,295 B1 12/2008 Gangadharan et al. ...... 709/232
8,130,699 B2 3/2012 Stanwood et al. ............ 370/328
(Continued)

FOREIGN PATENT DOCUMENTS

CN 103067978 A 4/2013
CN 103188285 A 7/2013
(Continued)

OTHER PUBLICATIONS

International Search Report and Written Opinion of International Search Authority for PCT/CN2015/093981 dated Jan. 12, 2016 (15 pages).
(Continued)

*Primary Examiner* — Shantell L Heiber
(74) *Attorney, Agent, or Firm* — Imperium Patent Works; Zheng Jin; Darien Wallace (57) ABSTRACT

A method of managing bandwidth resources provided by multiple network interfaces is proposed. When one or more network interfaces provide network bandwidth resources, a bandwidth manager manages all available bandwidth resources based on a list of decision criteria. The list of decision criteria includes energy efficiency, network throughput, channel condition, device mobility, and user preference. An application traffic flow distributor dynamically adjusts the amount of traffic flows on different network interfaces according to the joint decision based on the decision criteria. A network interface manager dynamically enables or disables each network interface according to the joint decision based on the decision criteria. Furthermore, a device movement analyzer analyzes and predicts device movement to facilitate accurate decision making of the bandwidth management.

23 Claims, 9 Drawing Sheets

(51) Int. Cl.
*H04W 52/02* (2009.01)
*H04W 88/06* (2009.01)

(52) U.S. Cl.
CPC ............. *H04W 88/06* (2013.01); *Y02D 70/00* (2018.01); *Y02D 70/1242* (2018.01); *Y02D 70/1262* (2018.01); *Y02D 70/142* (2018.01)

(56) References Cited

U.S. PATENT DOCUMENTS

| | | | | |
|---|---|---|---|---|
| 9,288,151 | B2* | 3/2016 | Chapman | H04L 47/22 |
| 9,730,271 | B2* | 8/2017 | Diab | H04W 88/06 |
| 2007/0026862 | A1* | 2/2007 | Hicks, III | H04W 36/30 455/436 |
| 2007/0178875 | A1* | 8/2007 | Rao | H04W 56/0035 455/343.1 |
| 2009/0168701 | A1 | 7/2009 | White et al. | 370/328 |
| 2010/0105394 | A1* | 4/2010 | Cheng | H04W 36/32 455/440 |
| 2012/0077483 | A1 | 3/2012 | Abraham et al. | 455/422.1 |
| 2012/0239799 | A1* | 9/2012 | Wang | H04L 41/145 709/224 |
| 2013/0089026 | A1* | 4/2013 | Piper | H04W 4/00 370/328 |
| 2013/0268986 | A1 | 10/2013 | Venkatachalam et al. | 725/109 |
| 2014/0313989 | A1 | 10/2014 | Doken et al. | 370/329 |
| 2015/0004980 | A1* | 1/2015 | Vannithamby | H04W 48/18 455/437 |
| 2015/0141021 | A1* | 5/2015 | Kapoulas | H04W 36/32 455/441 |

FOREIGN PATENT DOCUMENTS

| | | |
|---|---|---|
| CN | 103188287 A | 7/2013 |
| CN | 103491653 | 1/2014 |
| WO | WO2012148482 | 11/2012 |
| WO | WO2012148482 A1 | 11/2012 |
| WO | WO2102148482 * | 11/2012 |

OTHER PUBLICATIONS

EPO, search report for the EP patent application 15857519.1 dated Feb. 15, 2018 (15 pages).

EPO, search report for the EP patent application 15857519.1 dated May 28, 2018 (15 pages).

* cited by examiner

METHOD AND APPARATUS FOR HETEROGENEOUS COMMUNICATION

CROSS REFERENCE TO RELATED APPLICATIONS

This application claims priority under 35 U.S.C. § 119 from U.S. Provisional Application No. 62/076,128, entitled "Methods for Intelligent Traffic Steering by Heterogeneous Communication", filed on Nov. 6, 2014, the subject matter of which is incorporated herein by reference.

TECHNICAL FIELD

The disclosed embodiments relate generally to wireless communication, and, more particularly, to method for intelligent traffic steering for Heterogeneous Communication.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). The $3^{rd}$ generation partner project (3GPP) network normally includes a hybrid of 2G/3G/4G systems. With the optimization of the network design, many improvements have developed over the evolution of various standards.

The exponential growth of mobile subscribers requires substantial increase of network capacity. However, the capacity of a given network access technology network is limited by the laws of physics. The current cellular network deployed, such as 3G, LTE, LTE-A, suffers from limited licensed spectrum availability restraining the potential capacity increase. Small cell technologies, such as Wi-Fi WLAN, are ideally positioned to extend the current cellular network capacity. Wi-Fi appeals to many operators as a cost-effective mean of offloading large amounts of mobile data traffic, especially indoors where most of the traffic is generated. Operators are already taking advantage of devices supporting Wi-Fi as a tool to meet capacity demands by letting the user manually offload its traffic on standalone networks.

With the development of dual mode mobility devices, the focus of WLAN-cellular offload has evolved from purely static, manual, unsecure offloading traffic from cellular (e.g., 3G WCDMA HSPA or 4G LTE) to WLAN at the collocated UE/STA, to dynamic, automatic, secure, and seamless offloading and interworking between WLAN STA-AP systems and LTE UE-RAN-EPC networks, yet with mobility and roaming support between HPLMN and VPLMN. Assume that collocated cellular UE and WLAN STA chipsets, on a smart phone device for example, can coexist harmoniously in different bands without interfering with each other. Given this assumption, WLAN-cellular radio can be activated at the same time without much concern of cross-interference. Hence, intelligence is needed at the device to automatically decide in real time when to turn on both radios, in what order and to what benefit, and how to offload traffic in-between them or concurrently use the two radios for better user experience.

Today, most smart phones and tablets are equipped with multiple radio modules (e.g., Wi-Fi and 3G/4G radio) with internet connectivity of different capability and data plans. However, these radio resources are not being used in an efficient way. First, only one radio module can be used at the same time for packet data transmission. Second, long interruption time when changing from one radio network to another radio network (e.g., from 3G/4G to Wi-Fi). Third, bandwidth resource of different devices cannot be shared among devices even if they are collocated with each other.

A solution is sought.

SUMMARY

A method of managing bandwidth resources provided by multiple network interfaces (through-connected network and/or different devices) is proposed. When one or more network interfaces provide network bandwidth resources, a bandwidth manager manages all available bandwidth resources based on a list of decision criteria. The list of decision criteria includes energy efficiency, network throughput, channel condition, device mobility, and user preference. An application traffic flow distributor dynamically adjusts the amount of traffic flows on different network interfaces according to the joint decision based on the decision criteria. A network interface manager dynamically enables or disables each network interface according to the joint decision based on the decision criteria. Furthermore, a device movement analyzer analyzes and predicts device movement to facilitate accurate decision making of the bandwidth management.

In one embodiment, a user equipment (UE) activates a first network interface for transmitting and receiving IP data packets through a first radio access technology in a heterogeneous network. The UE activates a second network interface for transmitting and receiving IP data packets through a second radio access technology. The UE determines a traffic flow distribution based on one or more predefined criteria. The traffic flow is associated with one or more applications. The UE directs a first portion of the traffic flow to the first network interface and directs a second portion of the traffic flow to the second network interface.

In another embodiment, a user equipment (UE) establishes a first data connection via a first radio access technology (RAT) using a first radio module in a heterogeneous network. The UE predicts a radio signal strength indication of the first radio access technology. The UE establishes a data connection via a second RAT using a second radio module based on the prediction result and a fast network-switching algorithm. The UE switches from the first RAT to the second RAT before a radio link failure event occurs in the first RAT.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 illustrates traffic flow distribution criteria for intelligent traffic steering when both cellular and Wi-Fi radio interfaces are on.

DETAILED DESCRIPTION

Reference will now be made in detail to some embodiments of the invention, examples of which are illustrated in the accompanying drawings.

Figure 1:
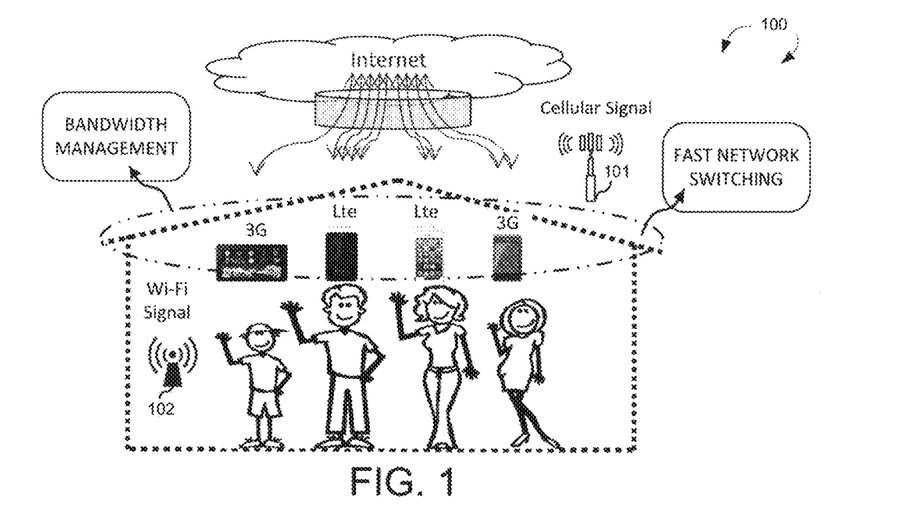
FIG. 1 illustrates an exemplary heterogeneous wireless network with bandwidth management and traffic steering in accordance with one novel aspect.

FIG. 1 illustrates an exemplary heterogeneous wireless system 100 with bandwidth management and intelligent traffic steering in accordance with one novel aspect. Heterogeneous wireless system 100 comprises a plurality of cellular base stations (e.g., BS 101) and a plurality of Wi-Fi access points (e.g., AP 102) that provide different radio access to IP data (e.g., the Internet) through different radio access networks (RANs) or different radio access technologies (RATs). A plurality of users have a plurality of user equipments (UEs) such as smart phones and tablets. Each UE is equipped with one or more network interfaces (e.g., radio modules) for accessing the Internet for packet data services via different RATs, e.g., 2G/3G/LTE-4G and Wi-Fi. However, the radio resources over the different networks are typically not being used in an efficient way. First, only one radio module can be used at the same time for packet data transmission and reception. Second, long interruption time occurs when changing from one radio access network to another radio access network (e.g., from 3G/4G to Wi-Fi). Third, bandwidth resource of different devices cannot be shared among devices even if they are collocated with each other.

In accordance with one novel aspect, a method of managing bandwidth resources provided by multiple network interfaces is proposed. When one or more network interfaces provide network bandwidth resources, a bandwidth manager manages all available bandwidth resources based on a list of decision criteria. The list of decision criteria includes energy efficiency, network throughput, channel condition, device mobility, and user preference. An application traffic flow distributor dynamically adjusts the amount of traffic flows on different network interfaces according to the joint decision based on the decision criteria. A network interface manager dynamically enables or disables each network interface according to the joint decision based on the decision criteria. Furthermore, a device movement analyzer analyzes and predicts device movement to facilitate accurate decision making of the bandwidth management and fast network switching between the different network interfaces.

Figure 2:
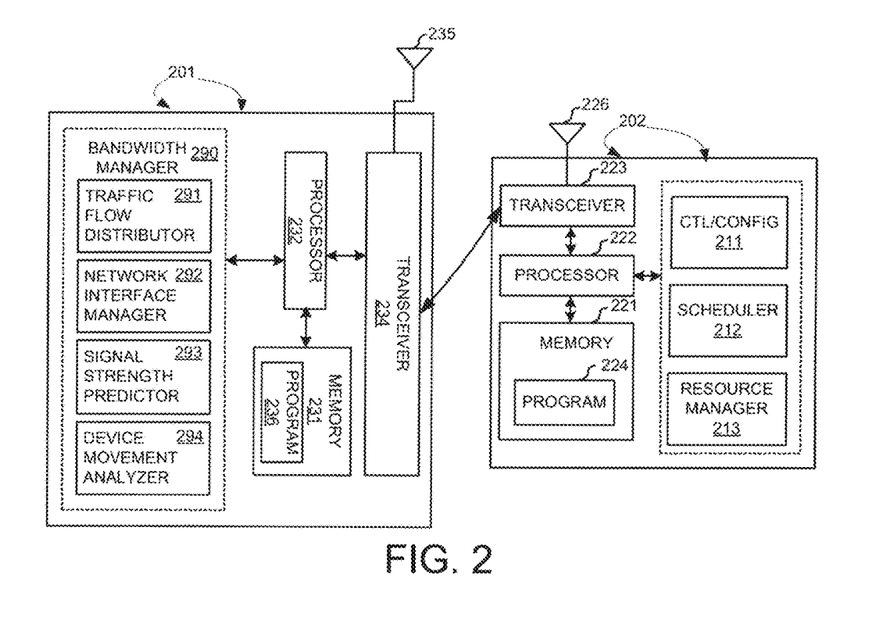
FIG. 2 illustrates simplified block diagrams of a user equipment UE 201 and a base station (BS) or an access point (AP) in accordance with embodiments of the current invention.

FIG. 2 illustrates simplified block diagrams of a user equipment UE 201 and a base station or access point BS/AP 202 in accordance with embodiments of the current invention. BS/AP 202 has an antenna 226, which transmits and receives radio signals. A RF transceiver module 223, coupled with the antenna, receives RF signals from antenna 226, converts them to baseband signals and sends them to processor 222. RF transceiver 223 also converts received baseband signals from processor 222, converts them to RF signals, and sends out to antenna 226. Processor 222 processes the received baseband signals and invokes different functional modules to perform features in BS/AP 202. Memory 221 stores program instructions and data 224 to control the operations of BS/AP 202. BS/AP 202 also includes a set of control circuits, such as a control and configuration circuit 211, a scheduler 212, and a resource manager 213 that carry out functional tasks and features in the network.

Similarly, UE 201 has an antenna 235, which transmits and receives radio signals. A RF transceiver module 234, coupled with the antenna, receives RF signals from antenna 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in the mobile station 201. Memory 231 stores program instructions and data 236 to control the operations of the mobile station 201.

UE 201 also includes a set of control circuits that carry out functional tasks. A bandwidth manager 290 manages all available bandwidth resources based on a list of decision criteria. The list of decision criteria includes energy efficiency, network throughput, channel condition, device mobility, and user preference. The bandwidth manager further comprises an application traffic flow distributor 291 that dynamically adjusts the amount of traffic flows on different network interfaces according to the joint decision based on the decision criteria, a network interface manager 292 that dynamically enables or disables each network interface according to the joint decision based on the decision criteria, a signal strength predictor 293 that predicts radio signal strength, and a device movement analyzer 294 that analyzes and predicts device movement to facilitate accurate decision making of the bandwidth management and fast network switching between the different network interfaces.

Figure 3A:
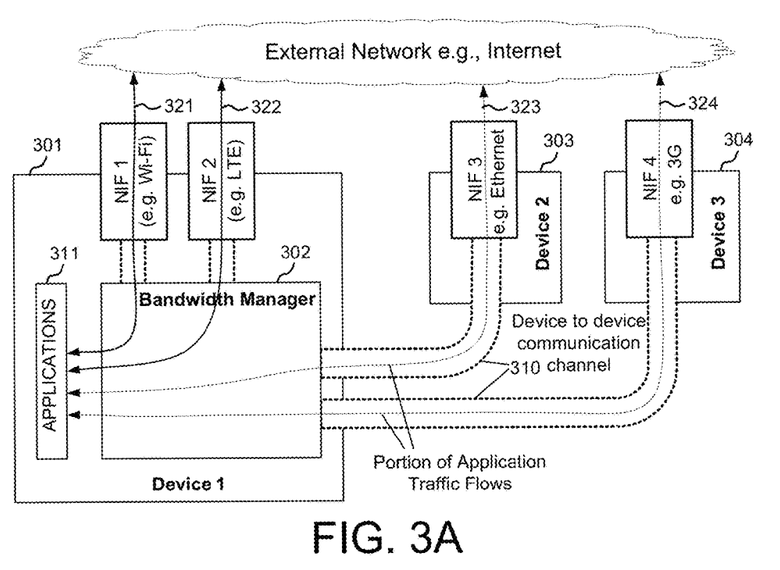
FIG. 3A illustrates a simplified block diagram of a user equipment with a centralized bandwidth manager for traffic steering in accordance with embodiments of the current invention.

FIG. 3A illustrates a simplified block diagram of a user equipment UE 301 with a centralized bandwidth manager 302 for traffic steering in accordance with embodiments of the current invention. In the example of FIG. 3A, UE 301

(device 1) comprises a bandwidth manager 302 that manages all application traffic 311 for device 1, device 2 (UE 303), and device 3 (UE 304). Device 1 comprises a first network interface NIF 1 (e.g., Wi-Fi) and a second network interface NIF 2 (e.g., LTE). Device 2 comprises a third network interface NIF 3 (e.g., Ethernet), and device 3 comprises a fourth network interface NIF 4 (e.g., 3G). The traffic flows from applications 311 passes through the bandwidth manager 302, which distributes the traffic flows to each of the network interfaces according to the joint decision based on certain decision criteria (e.g., maximize network throughput, minimize UE power consumption, and user preference). As a result, a first portion of the traffic flows 321 is distributed to NIF 1, a second portion of the traffic flows 322 is distributed to NIF 2, a third portion of the traffic flows 323 is distributed to NIF 3, and a fourth portion of the traffic flows 324 is distributed to NIF 4.

Figure 3B:
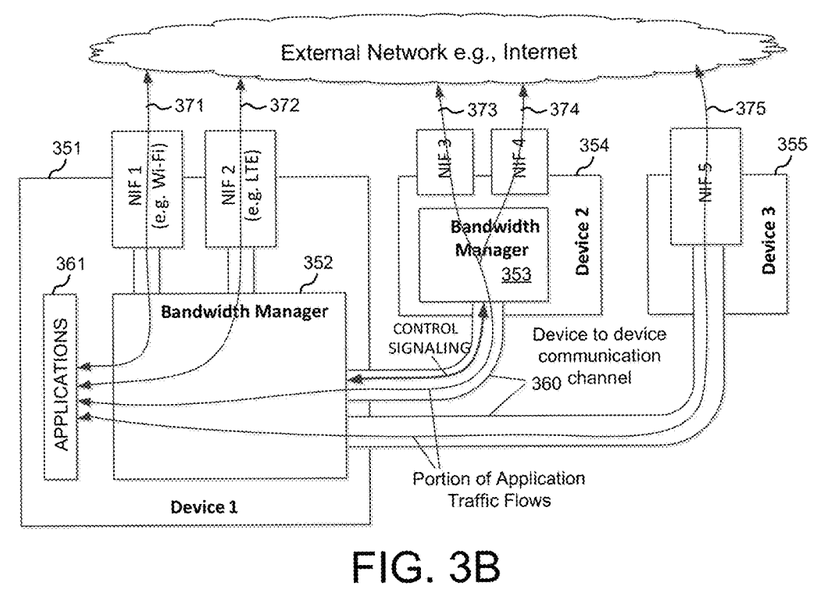
FIG. 3B illustrates a simplified block diagram of a user equipment with a distributed bandwidth manager for traffic steering in accordance with embodiments of the current invention.

FIG. 3B illustrates a simplified block diagram of a user equipment 351 with distributed bandwidth managers 352 and 353 for traffic steering in accordance with embodiments of the current invention. While the embodiment of FIG. 3A has one centralized bandwidth manager, the embodiment of FIG. 3B has multiple distributed bandwidth manager, e.g., bandwidth manager 352 in device 1 (UE 351), and bandwidth manager 353 in device 2 (UE 354). The multiple bandwidth managers 352 and 353 coordinate with each other via control signaling through device-to-device communication channel 360. Similar to FIG. 3A, the traffic flows from applications 361 passes through the bandwidth managers 352 and 353, which distribute the traffic flows to each of the network interfaces according to the joint decision based on certain decision criteria (e.g., maximize network throughput, minimize UE power consumption, and user preference). As a result, a first portion of the traffic flows 371 is distributed to NIF 1, a second portion of the traffic flows 372 is distributed to NIF 2, a third portion of the traffic flows 373 is distributed to NIF 3, a fourth portion of the traffic flows 374 is distributed to NIF 4, and a fifth portion of the traffic flow 375 is distributed to NIF 5.

Figure 4:
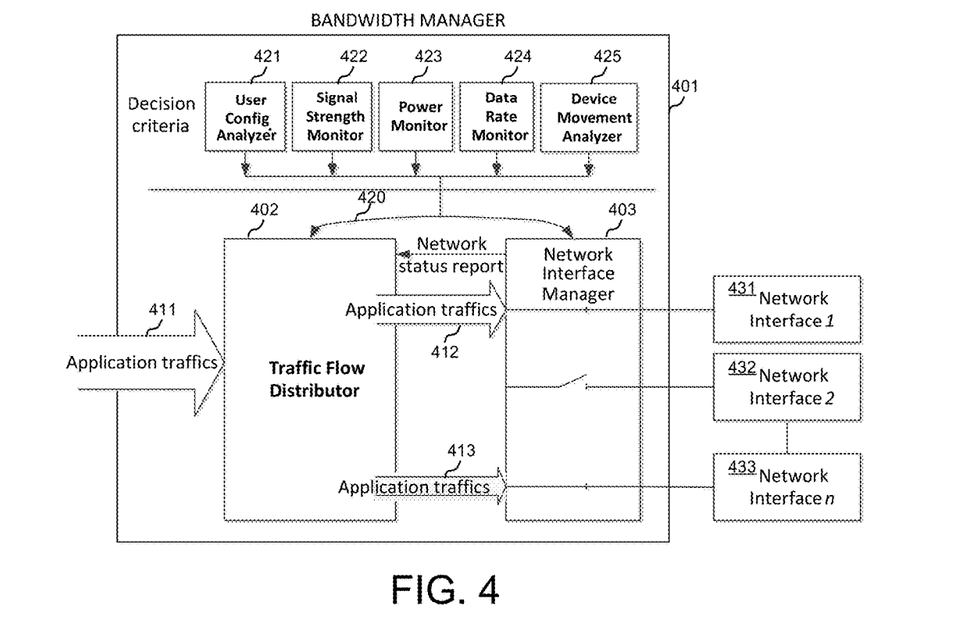
FIG. 4 illustrates a more detailed block diagram of a bandwidth manager for traffic steering in a heterogeneous wireless network in accordance with embodiments of the current invention.

FIG. 4 illustrates a more detailed block diagram of a bandwidth manager 401 for traffic steering in a heterogeneous wireless network in accordance with embodiments of the current invention. Bandwidth manager 401 manages all available bandwidth resources based on a list of decision criteria. The bandwidth manager then distributes application traffics 411 to each of the network interfaces 431, 432, 433 (NIF 1, NIF 2, through NIF n) according to the joint decision based on the list of decision criteria. In the embodiment of FIG. 4, bandwidth manager 401 comprises a traffic flow distributor 402 and a network interface manager 403. The bandwidth manager 401 further comprises a plurality of monitors/analyzers for making a plurality of decisions based on different criteria, including user configuration analyzer 421, signal strength monitor 422, power monitor 423, data rate monitor 424, and device movement analyzer 425. The user configuration analyzer 421 takes user preference of performance and power saving with optionally a weighting factor. Signal strength monitor 422 monitors and predicts the radio signal strength associated with each network interface. Power monitor 423 monitors the energy-per-bit associated with each network interface. Data rate monitor 424 monitors the packet data rate associated with each network interface. Device movement analyzer 425 analyzes UE mobility states based on UE speed. The joint analyzing and monitoring decisions are then used by traffic flow distributor 402 and network interface manager 403 as input criteria 420 to distribute application traffics 411 into different portions of traffic data to be flowed into different network interfaces through network interface manager 403. In one example, a portion of application traffics 412 flows into network interface 1, while another portion of application traffics 413 flows into network interface n.

Bandwidth Aggregation and Traffic Steering

Figure 5:
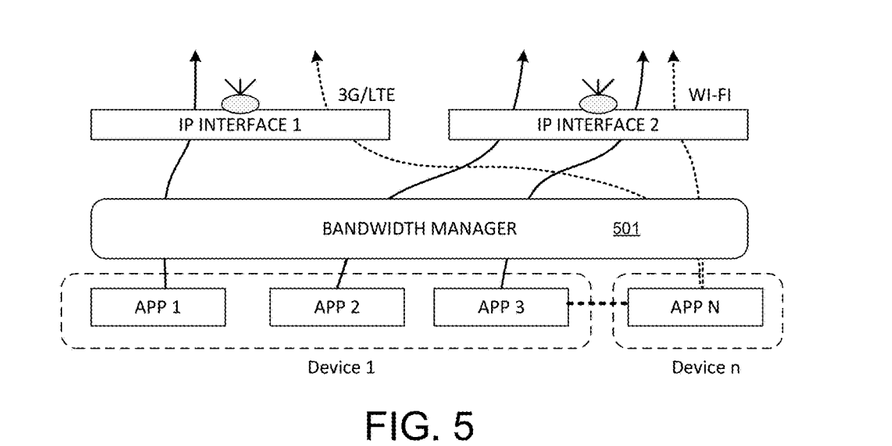
FIG. 5 illustrates an example of bandwidth aggregation of both cellular and Wi-Fi radio interface for throughput boosting.

FIG. 5 illustrates an example of bandwidth aggregation of both cellular and Wi-Fi radio interfaces for throughput boosting. In the example of FIG. 5, a first IP interface 1 is 3G/LTE, and a second IP interface 2 is Wi-Fi. The bandwidth manager 501 aggregates all application traffics of different applications (e.g., AP 1 to APP N) from different devices (e.g., device 1 to device n), and then distributes different portions of the application traffic to IP interface 1 and IP interface 2. Both cellular and Wi-Fi radio interfaces are turned on and IP flows are dynamically distributed between cellular and Wi-Fi radio. In one specific example depicted by FIG. 5, IP traffic from APP 1 flows through IP interface 1, IP traffic from APP 2 and APP 3 flows through IP interface 2, IP traffic from APP N is split into two portion, one portion flows through IP interface 1, while another portion flows through IP interface 2.

Figure 6:
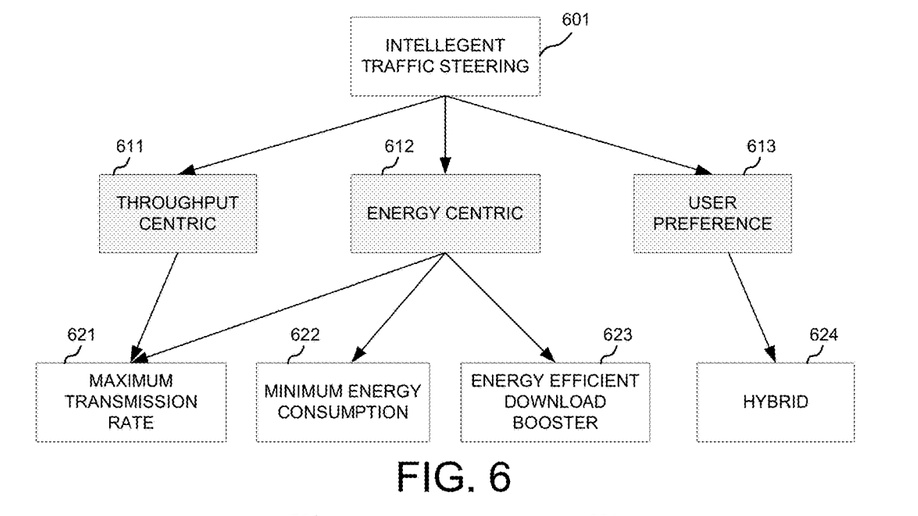

FIG. 6 illustrates traffic flow distribution criteria for intelligent traffic steering when both cellular and Wi-Fi radio interfaces are on. There can be many different traffic flow distribution criteria, depending on the purpose. As depicted by FIG. 6, intelligent traffic steering 601 can be performed under three different purposes: throughput centric (611), energy centric (612), and user preference (613). Under throughput-centric traffic-steering, maximum throughput can be achieved by maximizing transmission rate (621). Under energy-centric traffic-steering, maximum energy saving can be saved by minimizing energy consumption (622) and by energy-efficient download booster (623). In another embodiment, under energy-centric traffic steering, maximize the transmission rate (621) is achieved under the condition that energy is also saved. Under user preference based traffic steering, a hybrid approach (624) of different methods can be adopted.

Figure 7:
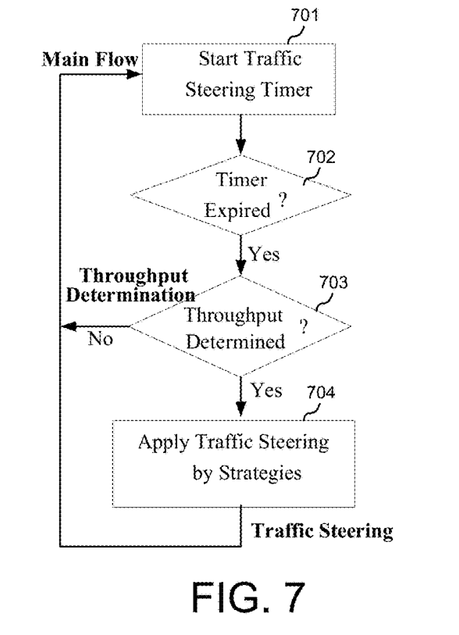
FIG. 7 is a flow chart of a method of traffic steering based on throughput.

FIG. 7 is a flow chart of a method of traffic steering based on throughput. In step 701, a UE starts a traffic-steering timer. In step 702, the UE checks whether the traffic-steering timer has expired. If the timer has expired, then the UE goes to step 703 for throughput determination. If throughput cannot be determined, then the UE goes back to step 701 and start over. If throughput can be determined, then the UE goes to step 704 and applies traffic steering by strategies.

Figure 8:
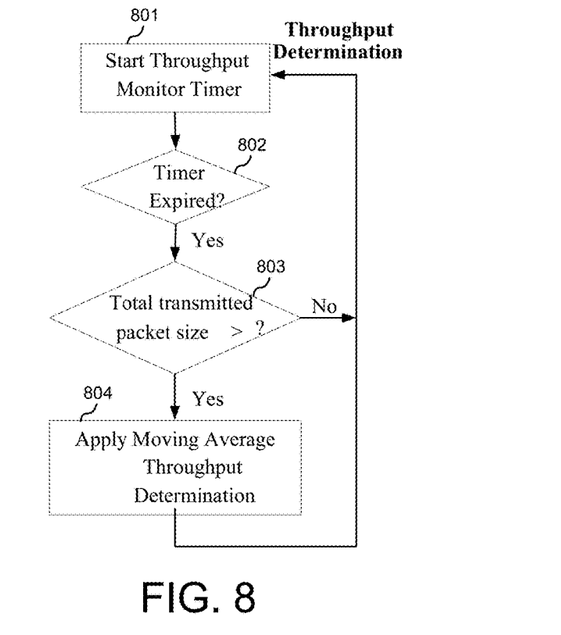
FIG. 8 is a flow chart of a method of throughput determination.

FIG. 8 is a flow chart of a method of throughput determination. The goal is to detect the network's throughput in real-time. In general, there are two approaches for detecting network throughput. In a first approach, a UE can probe the network's throughput by sending short packets periodically. In a second approach, the UE can dynamically monitor the out-sending or in-coming packets to determine the network's throughputs, e.g., when a user is browsing the Internet. After obtaining both information of sending time and sending packet size, the throughput could be determined by any throughput determination mechanism. In the example of FIG. 8, in step 801, a UE starts a throughput monitor timer. In step 802, the UE checks whether the throughput-monitor timer has expired. If the timer has expired, then the UE goes to step 803 to check if the total transmitted packet size is above a threshold. If the answer is no, then the UE goes back to step 801 to start over. If the answer to step 803 is yes, then the UE goes to step 804 to apply moving average throughput determination.

The throughput of enabling two network interface (e.g., Wi-Fi and cellular) can be determined by the following formula:

$$\frac{S}{\max\left\{\frac{S \times \theta_W}{D_W}, \frac{S \times \theta_C}{D_C}\right\}} = \min\left\{\frac{1}{\frac{\theta_W}{D_W}}, \frac{1}{\frac{\theta_C}{D_C}}\right\} = \min\left\{\frac{D_W}{\theta_W}, \frac{D_C}{\theta_C}\right\}$$

Where
$D_W$—Wi-Fi data rate in Mbps
$D_C$—Cellular data rate in Mbps
$\theta_W$—Ratio of traffic flows steered to Wi-Fi, $\theta_W + \theta_C = 1$
$\theta_C$—Ratio of traffic flows steered to cellular, $\theta_W + \theta_C = 1$
S—Total download data size in Mb Under the throughput-centric traffic steering, the goal is to maximize overall UE throughput. Because $\theta_W + \theta_C = 1$, the maximum throughput will be:

$$\max \text{ throughput} = \frac{D_W}{\theta_W} = \frac{D_C}{\theta_C}$$

$$\Rightarrow \theta_W = \frac{D_W}{D_C} \times \theta_C = \frac{D_W}{D_C} \times (1 - \theta_W) \Rightarrow \theta_W = \frac{\frac{D_W}{D_C}}{1 + \frac{D_W}{D_C}} = \frac{D_W}{D_W + D_C}$$

Without loss of generality, assume that $D_W > D_C$, then $$\min\left\{\frac{D_W}{\theta_W}, \frac{D_C}{\theta_C}\right\} \geq D_W \Rightarrow \begin{cases} \frac{D_W}{\theta_W} \geq D_W \\ \frac{D_C}{\theta_C} \geq D_W \end{cases} \Rightarrow \begin{cases} \theta_W \leq 1 \\ \frac{D_W}{D_C} \leq \frac{1}{\theta_C} \end{cases}$$

$$\Rightarrow \begin{cases} \theta_W \leq 1 \\ \theta_C \leq \frac{D_C}{D_W} \end{cases} \Rightarrow \begin{cases} \theta_W \leq 1 \\ \theta_W \geq 1 - \frac{D_C}{D_W} \end{cases}$$

Therefore, to get the better overall throughput, $\theta_C$ should be less than $D_C/D_W$.

Under the energy-centric traffic steering, the goal is to reduce energy consumption, e.g., in case of downloading. The general approach is to steer the data traffic between the networks by differentiating traffic ratio to achieve energy efficiency. For example, UE can steer more data traffic to the network consuming less energy-per-bit for data transmission. The ratios could be determined by the steering algorithm based on both energy and throughput requirements. In addition to energy efficiency, UE can steer traffic to achieve throughput gain. To minimize energy consumption:

$$\min\left\{\frac{P_W \times \theta_W}{D_W} + \frac{P_C \times \theta_C}{D_C}\right\} \Rightarrow \min\left\{\frac{P_W \times \theta_W}{D_W} + \frac{P_C \times (1 - \theta_W)}{D_C}\right\}$$

$$\Rightarrow \min\left\{\left(\frac{P_W}{D_W} - \frac{P_C}{D_C}\right) \times \theta_W + \frac{P_C}{D_C}\right\}$$

Where
$D_W$—Wi-Fi data rate in Mbps
$D_C$—Cellular data rate in Mbps
$\theta_W$—Ratio of traffic flows steered to Wi-Fi, $\theta_W + \theta_C = 1$
$\theta_C$—Ratio of traffic flows steered to cellular, $\theta_W + \theta_C = 1$
$P_W$—Wi-Fi transmission power
$P_C$—Cellular transmission power For extreme cases of minimize energy consumption, if $(P_W/D_W > P_C/D_C)$, then $\theta_W = 0$, which means only use cellular to download data can have minimum energy consumption. Otherwise, only use Wi-Fi can have minimum energy consumption. In such extreme cases, we can automatically enable the network that consumes less energy-per-bit and steer all data traffic through it to minimize the energy consumption.

Downloading can be boosted by enabling two network interfaces and achieve energy efficiency than single interface. Without loss of generality, assume that the default user preferred air interface is Wi-Fi, the total power consumption cost by downloading can be reduced if $$P_W \times \frac{S \times \theta_W}{D_W} + P_C \times \frac{S \times \theta_C}{D_C} < P_W \times \frac{S}{D_W}$$

$$\Rightarrow P_C \times \frac{\theta_C}{D_C} < P_W \times \frac{1}{D_W} - P_W \times \frac{\theta_W}{D_W}$$

$$\Rightarrow P_C \times \frac{1}{D_C} < P_W \times \frac{1}{D_W} \Rightarrow \frac{P_C}{P_W} < \frac{D_C}{D_W}$$

Both energy efficiency and throughput enhancement can be achieved by intelligent traffic ratio determination. Assume that $P_W < P_C$, if the user prefers to use Wi-Fi, then the cellular interface should be enabled only when $$\begin{cases} D_W < D_C \\ \frac{P_C}{P_W} < \frac{D_C}{D_W} \end{cases}$$

Otherwise, if the user prefers to use Cellular, then Wi-Fi interface should be enabled only when $$\begin{cases} D_W \geq D_C \\ D_W < D_C \text{ and } \frac{P_W}{P_C} < \frac{D_W}{D_C} \end{cases}$$

Under user preference centric traffic steering, the goal is to achieve hybrid optimization between performance and energy saving. The general approach is to adjust dynamically the weighting between performance and energy gain. For example, $$\max\{\alpha \cdot P + (1-\alpha) \cdot E\}$$

Figure 9:
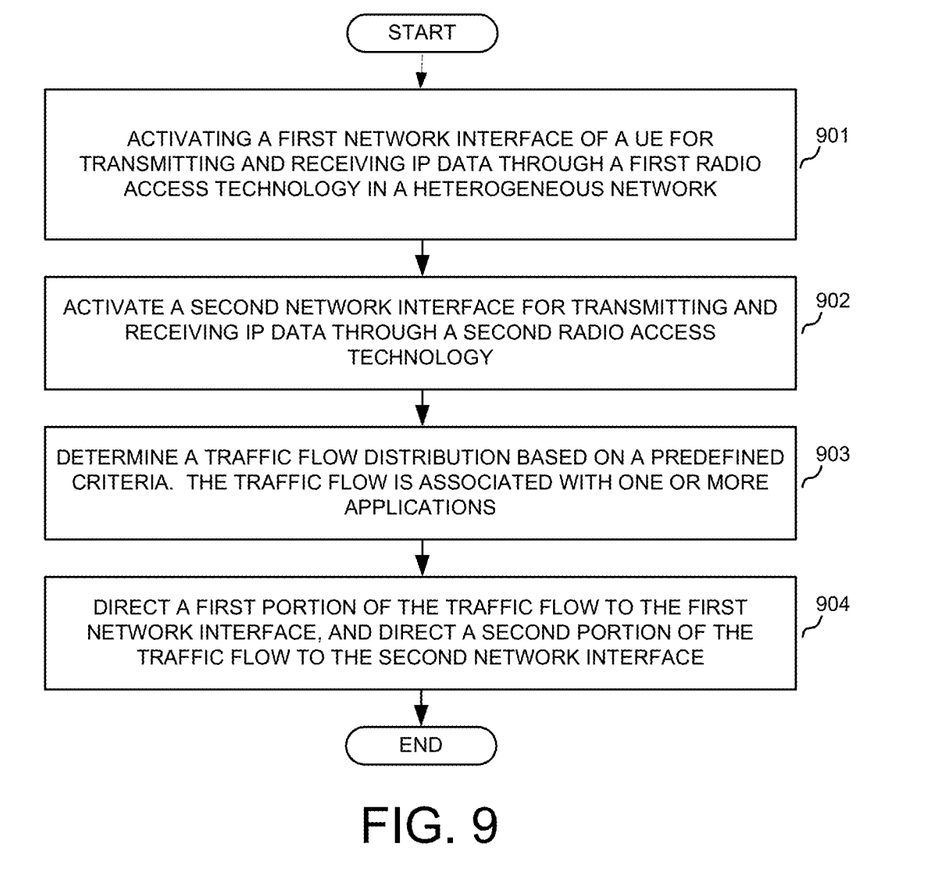
FIG. 9 illustrates a flow chart for a method of bandwidth aggregation and traffic steering in accordance with one novel aspect.

Where
P: performance gain, e.g., Heterogeneous throughput over original throughput
E: energy gain, e.g., original power consumption over Heterogeneous power consumption
α: weight of preference between performance and energy, e.g., α=1 for performance-centric UE, and α=0 for energy-centric UE FIG. 9 illustrates a flow chart for a method of bandwidth aggregation and traffic steering in accordance with one novel aspect. In step 901, a user equipment (UE) activates a first network interface for transmitting and receiving IP data packets through a first radio access technology in a heterogeneous network. In step 902, the UE activates a second network interface for transmitting and receiving IP data packets through a second radio access technology. In step 903, the UE determines a traffic flow distribution based on one or more predefined criteria. The traffic flow is associated with one or more applications. In step 904, the UE directs a first portion of the traffic flow to the first network interface and directs a second portion of the traffic flow to the second network interface.

Fast Network Switching

Figure 10:
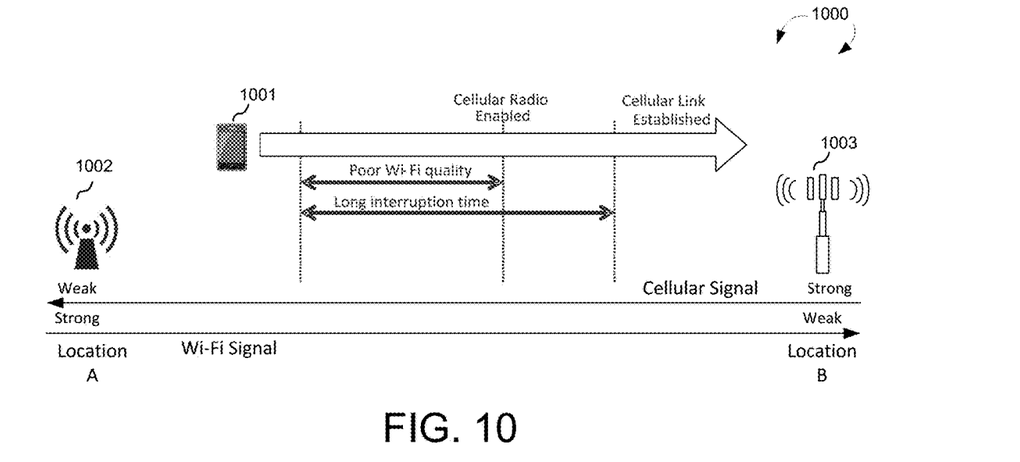
FIG. 10 illustrates a heterogeneous wireless network with fast network switching in accordance with one novel aspect.

FIG. 10 illustrates a heterogeneous wireless network 1000 with fast network switching in accordance with one novel aspect. Heterogeneous network 1000 comprises a user equipment UE 1001, an access point AP 1002 for Wi-Fi access, and a base station 1003 for cellular access. UE 1001 is initially associated with AP 1002 for data service. When UE 1001 moves from location A to location B, the Wi-Fi signal is getting weaker while the cellular signal is getting stronger. At certain time, UE 1001 detects poor Wi-Fi service quality, enables the cellular radio, and then switches from WLAN to cellular. Typically, UE 1001 has long service interruption time when changing from one radio network to another radio network, e.g., from Wi-Fi to cellular. This is because the cellular radio interface will not be enabled until Wi-Fi radio link failure occurs. In accordance with one novel aspect, UE 1001 enables the cellular radio interface to establish cellular link prior to Wi-Fi radio link failure, based on a Wi-Fi radio signal strength indicator (RSSI) predictor. UE 1001 manages the wireless connection by a make-before-break mechanism to enhance user experience.

Figure 11:
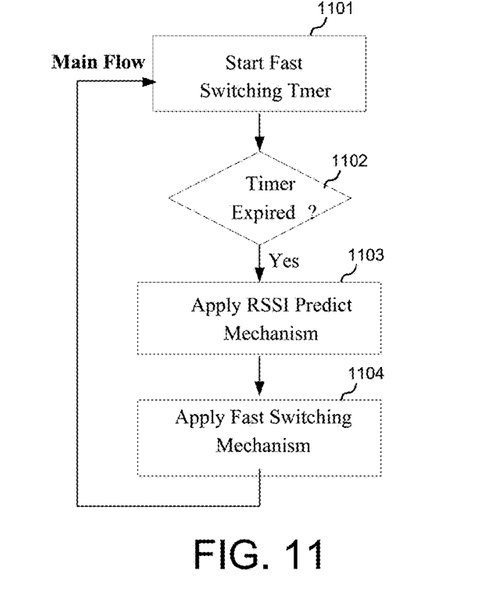
FIG. 11 is a flow chart of RSSI-based fast network switching.

FIG. 11 is a flow chart of RSSI-based fast network switching. In step 1101, a UE starts a fast-switching timer. In step 1102, the UE checks whether the fast-switching timer has expired. If yes, the UE goes to step 1103 to apply radio signal strength indication (RSSI) predict mechanism. After RSSI prediction, the UE goes to step 1104 to apply fast switching mechanism.

Figure 12:
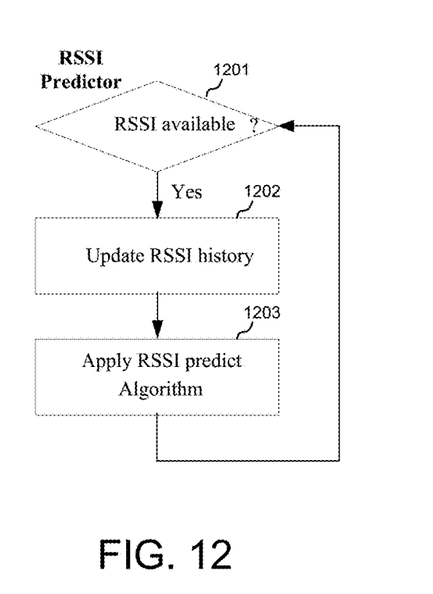
FIG. 12 is a flow chart of RSSI predictor mechanism.

FIG. 12 is a flow chart of RSSI predictor mechanism. In step 1201, a UE determines whether a new RSSI scanning result or an RSSI-changed notification is available. If the answer is yes, the UE goes to step 1202 to update RSSI history. The UE then goes to step 1203 to apply RSSI prediction algorithm. In general, the RSSI prediction can be performed using interpolation or extrapolation. For example, Lagrange and Neville are two prediction examples using interpolation and extrapolation. The Lagrange's classic formula can be expressed by:

$$P(x) = \frac{(x-x_2)(x-x_3)\ldots(x-x_N)}{(x_1-x_2)(x_1-x_3)\ldots(x_1-x_N)}y_1 + \frac{(x-x_1)(x-x_3)\ldots(x-x_N)}{(x_2-x_1)(x_2-x_3)\ldots(x_2-x_N)}y_2 + \ldots + \frac{(x-x_1)(x-x_2)\ldots(x-x_{N-1})}{(x_N-x_1)(x_N-x_2)\ldots(x_N-x_{N-1})}y_N$$

Where
  $P(x)$ is a polynomial of degree n that passes through n points
  $X_i$ is the time and index for each i
  $Y_i$ is the RSSI values in time index $X_i$
  Given $X_{n+1}$, we can predict $Y_{n+1}$ by using $P(X_n)$ The Neville's algorithm can be expressed by:

$$x_1: \quad y_1 = P_1$$
$$\qquad\qquad P_{12}$$
$$x_2: \quad y_2 = P_2 \qquad P_{123}$$
$$\qquad\qquad P_{23} \qquad P_{1234}$$
$$x_3: \quad y_3 = P_3 \qquad P_{234}$$
$$\qquad\qquad P_{34}$$
$$x_4: \quad y_4 = P_4$$

$$P_{i(i+1)\ldots(i+m)} = \frac{(x - x_{i+m})P_{i(i+1)\ldots(i+m-1)} + (x_i - x)P_{(i+1)(i+2)\ldots(i+m)}}{x_i - x_{i+m}}$$

Figure 13:
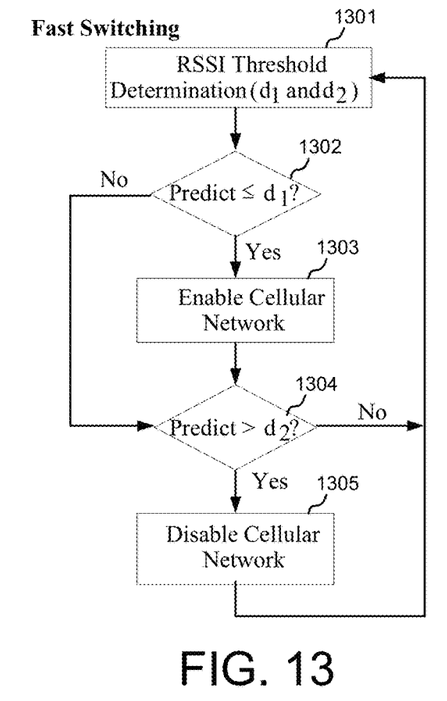
FIG. 13 is a flow chart of RSSI-based fast network switching using different RSSI thresholds.

Where
  $X_k$ is the time and index for each k
  $Y_k$ is the RSSI values in time index $x_k$
  $P_{i\ldots j}$ denotes the polynomial of degree j-i that passes through points $x_i$ to $x_j$
  Given $X_{j+1}$, we can predict $Y_{j+1}$ by using $P_{i\ldots j}$ FIG. 13 is a flow chart of RSSI-based fast network switching using different RSSI thresholds. In the example of FIG. 13, two different RSSI thresholds (d1 and d2) are defined for the fast network switching. A first threshold d1 is related to the radio signal level of the current RAT such that it is necessary to enable a second RAT. A second threshold d2 is related to the radio signal level of the current RAT such that it is OK to disable the second RAT. In step 1301, a UE first determines the two RSSI thresholds d1 and d2. In step 1302, the UE checks whether the predicted radio signal strength of the current RAT (e.g., Wi-Fi) is estimated to be equal or lower than the first threshold d1. If the answer is yes, then in step 1303, the UE enables the second RAT (e.g., the cellular network) and goes to step 1304. If the answer to step 1302 is no, then the UE goes to step 1304 directly. In step 1304, the UE checks whether the predicted radio signal strength of the current RAT (e.g., Wi-Fi) is higher than the second threshold d2. If the answer is yes, then in step 1305, the UE disables the second RAT (e.g., the cellular network). If the answer to step 1304 is no, then the UE goes back to step 1301 and starts over again.

In one specific embodiment, additional RSSI threshold values can be applied to improve performance. For example, if RSSI of a first RAT is below a first threshold, then UE enables a second RAT with high scanning rate. If RSSI is above a second threshold, then UE changes to medium scanning rate. If RSSI is above a third threshold, the UE changes to low scanning rate. Finally, if RSSI of the first RAT is above a fourth threshold, then the UE disables the second RAT.

Figure 14:
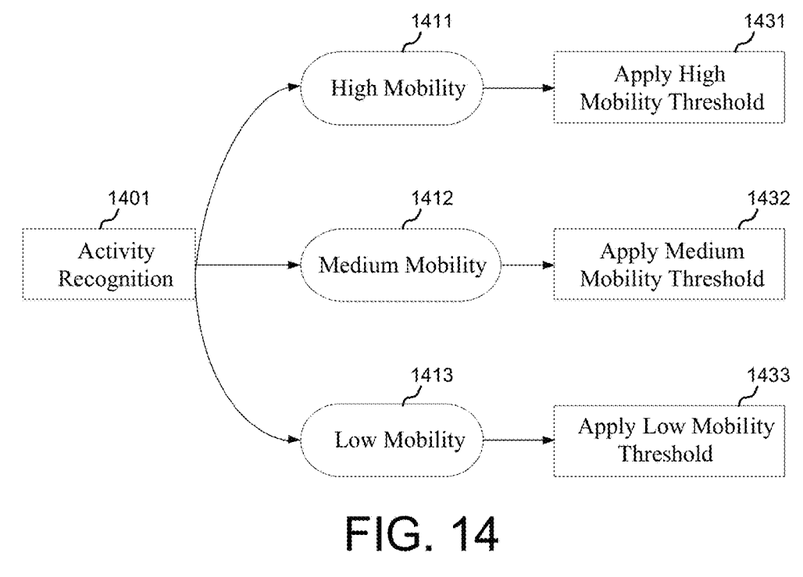
FIG. 14 illustrates a method of applying different RSSI thresholds based on UE mobility.

FIG. 14 illustrates a method of applying different RSSI thresholds based on UE mobility. The RSSI thresholds d1 and d2 are two important thresholds for enabling and disabling the cellular network. The RSSI thresholds can be fixed, or can be varied according to UE's mobility states. The UE first uses activity recognition (step 1401) to determine its mobility states, which can be categorized into high mobility (1411), medium mobility (1412), and low mobility (1413). Based on the UE mobility states, the UE then applies different high mobility RSSI thresholds (1431), medium mobility RSSI thresholds (1432), or low mobility RSSI thresholds (1433), respectively. For example, for low mobility UE, the RSSI thresholds can be d1=−80 dBm, and d2=−70 dBm. For high mobility UE, the RSSI thresholds can be d1=−70 dBm, and d2=−60 dBm.

Figure 15:
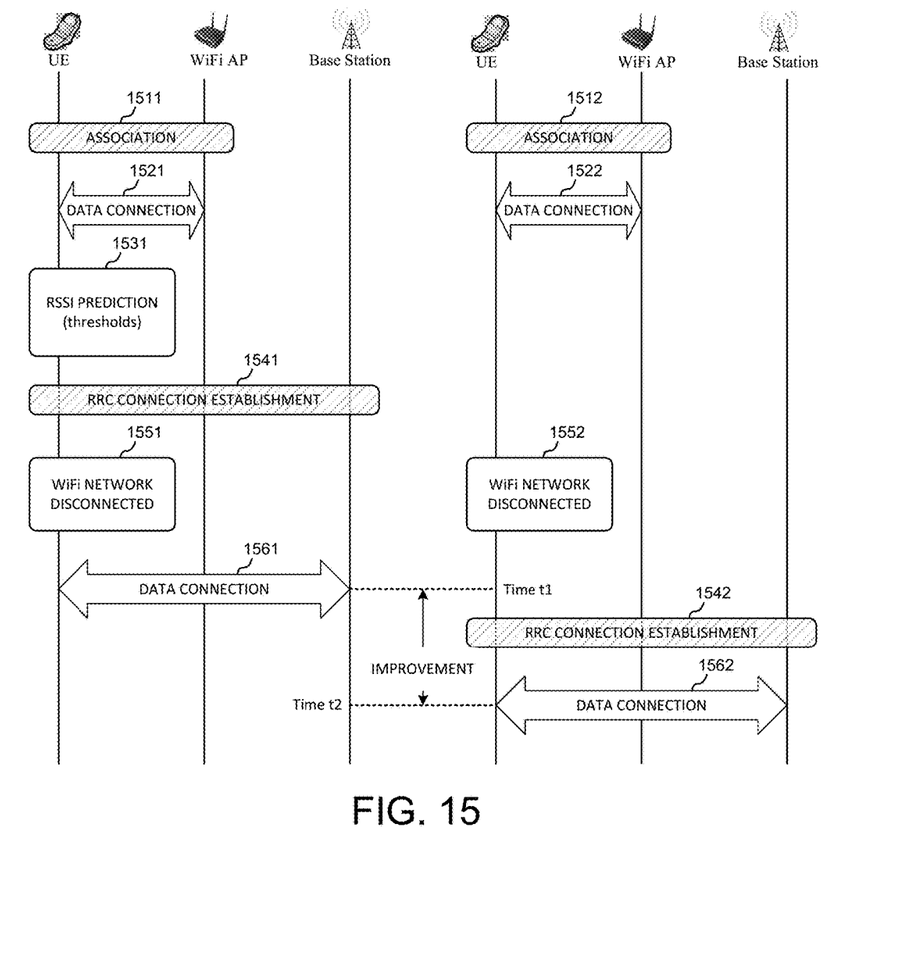
FIG. 15 illustrates a message sequence flow without and with fast network switching.

FIG. 15 illustrates a message sequence flow without and with fast network switching. The left part of FIG. 15 illustrates the scenario with fast network switching. In step 1511, the UE makes association with the Wi-Fi AP to access IP data service. In step 1521, the UE establishes a data connection with the AP for transmitting and receiving IP data packets. In step 1531, the UE makes RSSI prediction of the current WLAN and determines two RSSI thresholds. Upon triggering the fast network switching, in step 1541, the UE enables the cellular network interface and establishes an RRC connection with the base station. In step 1551, the Wi-Fi network is disconnected. In step 1561, the UE establishes a data connection with the base station and starts to transmitting and receiving IP data packets at time t1.

The right part of FIG. 15 illustrates the scenario without fast network switching. In step 1512, the UE makes association with the Wi-Fi AP to access IP data service. In step 1522, the UE establishes a data connection with the AP for transmitting and receiving IP data packets. In step 1552, the Wi-Fi network is disconnected. In step 1542, the UE enables the cellular network interface and establishes an RRC connection with the base station. In step 1562, the UE establishes a data connection with the base station and starts to transmitting and receiving IP data packets at time t2. It can be seen that without fast network switching, step 1542 occurs after step 1552. That is, the establishment of the RRC connection with the second network (1542) occurs after the first Wi-Fi network is disconnected (1552). As a result, the service interruption time is longer as compared to the service interruption time with fast network switching.

Figure 16:
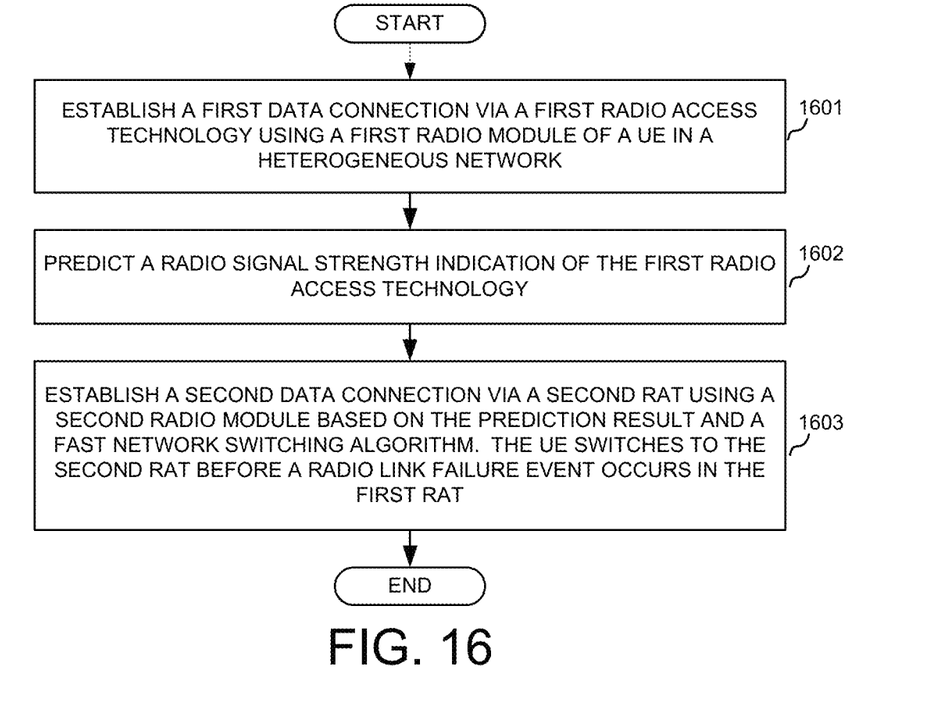
FIG. 16 illustrates a flow chart for a method of RSSI-based fast network switching in accordance with one novel aspect.

FIG. 16 illustrates a flow chart for a method of RSSI-based fast network switching in accordance with one novel aspect. In step 1601, a user equipment (UE) establishes a first data connection via a first radio access technology (RAT) using a first radio module in a heterogeneous network. In step 1602, the UE predicts a radio signal strength indication of the first radio access technology. In step 1603, the UE establishes a data connection via a second RAT using a second radio module based on the prediction result and a fast network-switching algorithm. The UE switches from the first RAT to the second RAT before a radio link failure event occurs in the first RAT.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
activating a first network interface of a user equipment (UE) for transmitting and receiving IP data through a first radio access technology (RAT) in a heterogeneous network;
activating a second network interface for transmitting and receiving IP data through a second RAT;
determining a first portion and a second portion of a traffic flow based on one or more predefined criteria, wherein the traffic flow is associated with an application, wherein one of the predefined criteria is maximizing an overall data throughput of the UE, wherein the overall data throughput is determined by dynamically monitoring a total size of incoming and outgoing data packets sent during a timed transmission period while the application is running, wherein the first portion corresponds to a first ratio of the traffic flow through the first RAT, wherein the second portion corresponds to a second ratio of the traffic flow through the second RAT, and wherein the first portion includes some amount of the traffic flow and the second portion includes some amount of the traffic flow; and
directing the first portion of the traffic flow to the first network interface, and concurrently directing the second portion of the traffic flow to the second network interface.

2. The method of claim 1, wherein a second of the predefined criteria is minimizing a UE power consumption.

3. The method of claim 2, wherein the UE power consumption is reduced by steering more traffic flow to a corresponding network interface using a radio access technology that consumes less energy-per-bit while data is being transmitted.

4. The method of claim 1, wherein the directing the first portion and concurrently directing the second portion is performed at an application layer of the outgoing data packets.

5. The method of claim 1, wherein a second of the predefined criteria is satisfying a user preference, and wherein the user preference indicates a weighting between the system throughput and the UE power consumption.

6. The method of claim 1, wherein the UE directs a third portion of the traffic flow to a third network interface, and wherein the third network interface belongs to another user equipment.

7. A user equipment (UE), comprising:
a first network interface for transmitting and receiving IP data through a first radio access technology (RAT) in a heterogeneous network;
a second network interface for transmitting and receiving IP data through a second RAT;
a bandwidth manager that determines a first portion and a second portion of a traffic flow based on one or more predefined criteria, wherein the traffic flow is associated with an application, wherein one of the predefined criteria is maximizing an overall data throughput of the UE, wherein the overall data throughput is determined by dynamically monitoring a total size of incoming and outgoing data packets sent during a timed transmission period while the application is running, wherein the first portion corresponds to a first ratio of the traffic flow through the first RAT, wherein the second portion corresponds to a second ratio of the traffic flow through the second RAT, and wherein the first and second portions each includes some amount of the traffic flow; and
a traffic flow distributor that directs the first portion of the traffic flow to the first network interface, and concurrently directs the second portion of the traffic flow to the second network interface.

8. The UE of claim 7, wherein a second of the predefined criteria is minimizing a UE power consumption.

9. The UE of claim 8, wherein the UE power consumption is reduced by steering more traffic flow to a corresponding network interface using a radio access technology that consumes less energy-per-bit while data is being transmitted.

10. The UE of claim 7, wherein the traffic flow distributor directs the first portion and concurrently directs the second portion at an application layer of the outgoing data packets.

11. The UE of claim 7, wherein a second of the predefined criteria is satisfying a user preference, and wherein the user preference indicates a weighting between the system throughput and the UE power consumption.

12. The UE of claim 7, wherein the UE directs a third portion of the traffic flow to a third network interface, and wherein the third network interface belongs to another user equipment.

13. A method comprising:
activating a first network interface of a user equipment (UE) for transmitting and receiving IP data through a first radio access technology (RAT) in a heterogeneous network;
activating a second network interface for transmitting and receiving IP data through a second RAT;
determining a first portion and a second portion of a traffic flow based on one or more predefined criteria, wherein the traffic flow is associated with an application, wherein the first portion corresponds to a first ratio of the traffic flow through the first RAT, wherein the second portion corresponds to a second ratio of the traffic flow through the second RAT, and wherein the first portion includes some amount of the traffic flow and the second portion includes some amount of the traffic flow;
directing the first portion of the traffic flow to the first network interface, and concurrently directing the second portion of the traffic flow to the second network interface; and
maximizing an overall data throughput of the UE, wherein a data throughput rate of the second RAT is greater than a data throughput rate of the first RAT, and wherein the determining the first portion is performed by setting the first ratio of the traffic flow through the first RAT to be less than a proportion equaling the data throughput rate through the first RAT divided by the data throughput rate of the second RAT.

14. The method of claim 13, wherein the predefined criteria is minimizing a UE power consumption.

15. The method of claim 14, wherein the UE power consumption is reduced by steering more traffic flow to a corresponding network interface using a radio access technology that consumes less energy-per-bit while data is being transmitted.

16. The method of claim 13, wherein the overall data throughput of the UE is determined by dynamically monitoring data packets of the network.

17. The method of claim 13, wherein the predefined criteria is satisfying a user preference, and wherein the user preference indicates a weighting between the system throughput and the UE power consumption.

18. The method of claim 13, wherein the UE directs a third portion of the traffic flow to a third network interface, and wherein the third network interface belongs to another user equipment.

19. A user equipment (UE), comprising:
a first network interface for transmitting and receiving IP data through a first radio access technology (RAT) in a heterogeneous network;
a second network interface for transmitting and receiving IP data through a second RAT;
a bandwidth manager that determines a first portion and a second portion of a traffic flow based on one or more predefined criteria, wherein the traffic flow is associated with an application, wherein the first portion corresponds to a first ratio of the traffic flow through the first RAT, wherein the second portion corresponds to a second ratio of the traffic flow through the second RAT, and wherein the first and second portions each includes some amount of the traffic flow; and
a traffic flow distributor that maximizes an overall data throughput of the UE by directing the first portion of the traffic flow to the first network interface, and concurrently directing the second portion of the traffic flow to the second network interface, wherein a data throughput rate of the second RAT is greater than a data throughput rate of the first RAT, and wherein the bandwidth manager determines the first portion by setting the first ratio of the traffic flow through the first RAT to be less than a proportion equaling the data throughput rate through the first RAT divided by the data throughput rate of the second RAT.

20. The UE of claim 19, wherein the predefined criteria is minimizing a UE power consumption.

21. The UE of claim 20, wherein the UE power consumption is reduced by steering more traffic flow to a corresponding network interface using a radio access technology that consumes less energy-per-bit while data is being transmitted.

22. The UE of claim 19, wherein the predefined criteria is satisfying a user preference, and wherein the user preference indicates a weighting between the system throughput and the UE power consumption.

23. The UE of claim 19, wherein the UE directs a third portion of the traffic flow to a third network interface, and wherein the third network interface belongs to another user equipment.

* * * * *